Feb. 17, 1959  P. ANGENIEUX  2,873,646
MECHANISM FOR VARIABLE FOCAL LENGTH OBJECTIVE
Filed Sept. 1, 1955
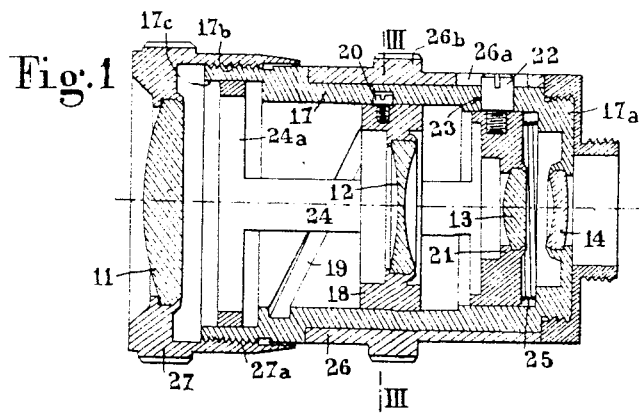
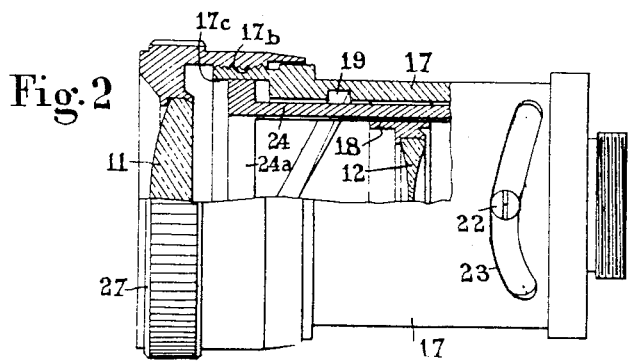
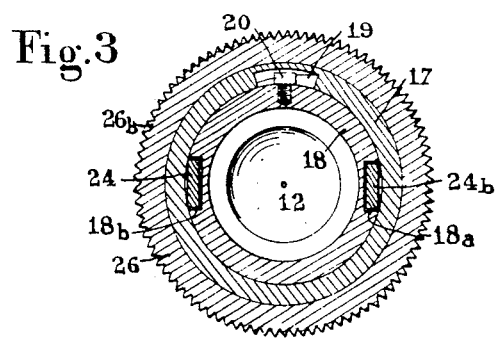
Inventor:
Pierre Angenieux
by:
Michael S. Striker
agt.

United States Patent Office 2,873,646
Patented Feb. 17, 1959

2,873,646

MECHANISM FOR VARIABLE FOCAL LENGTH OBJECTIVE

Pierre Angenieux, Paris, France

Application September 1, 1955, Serial No. 531,859

Claims priority, application France October 22, 1954

4 Claims. (Cl. 88—57)

This invention relates to a control mechanism for a variable focal-length lens of the type comprising a pair of fixed end optical elements and, intermediate these elements, another pair of movable optical elements adapted to move axially relative to said fixed elements according to a predetermined law with a view to produce an image the magnification of which varies continuously while its position remains stable with respect to said fixed elements.

It is the essential object of this invention in an optical system of the type broadly defined hereinabove to produce the displacement of the two movable elements thereof by means of a simple and precise mechanism controlling the movements of these two elements, this mechanism being actuated from a single member by simply rotating this member.

Other objects of the invention will become apparent hereinafter, whereas the nature and scope of said invention are briefly outlined in the appended claims.

The attached drawing forming part of this specification illustrates diagrammatically by way of example one form of embodiment of the invention as applied to a four-element optical system wherein the lenses in the front-to-rear direction (i. e. from the object) are assumed to be alternately convergent and divergent, it being understood however that the invention is not subordinate to the nature of these fixed and movable elements.

In the drawing:

Figure 1 is an axial section showing the lens mount and the control mechanism according to the invention.

Figure 2 is a top view with parts broken away of the device of Fig. 1, the outer control sleeve being removed for the sake of clarity, and Figure 3 is a cross-sectional view taken upon the line III—III of Fig. 1.

A fixed tube 17 has slidably mounted therein a barrel 18 carrying the front movable lens 12. A helical inner groove 19 formed in the bore wall of the aforesaid tube 17 is engaged by a pin 20 rigid with, and projecting from the barrel 18 so that the latter is compelled to move in the tube 17 along a helical path. Another barrel 21 carrying the rear movable lens 13 is formed with a pair of lateral longitudinal lugs 24, 24b engaging in smooth frictional engagement a pair of corresponding longitudinal grooves 18, 18b formed in the barrel 18. The front end portions of these lugs 24, 24b are rigidly interconnected through a ring 24a centered in a bore 17c of tube 17. The barrel 21 has secured thereon a projecting pin 22 the central portion of which is guided in a curved transverse slot 23 formed in the tube 17. This slot 23 acts as a cam-groove to guide the barrel 21 in its axial movements when the projecting pin 22 is rotated. Thus, a compound rotary and axial movement is impressed to this barrel 21 whereby the element 13 will be moved axially.

Of course, the respective positions of the pin 22 carried by the barrel 21 in the example illustrated and of the slot 23 formed in the tube 17 may be reversed, this slot being also adapted to be formed on the barrel 21 (which constitutes a convenient solution in the practice), in which case the pin will be secured on the tube 17 so that two symmetrical pin-and-slot devices may be utilized.

When the barrel 21 is rotated the lugs 24, 24b transmit a helical movement to the barrel 18 causing in turn the axial displacement of the element 12. The law governing the movement of elements 12 and 13 is adhered to if the pitch of the helical groove 19, on the one hand, and the shape of the cam-groove forming slot 23, on the other hand, are properly selected. A spring 25 exerting an axial thrust on the barrel 21 will ensure a permanent engagement between the pin 22 and the rear face of slot 23 so as to avoid any axial play during the operation of the system.

The rotational movement of barrel 21 is controlled by an outer sleeve 26 threaded on tube 17 and adapted to be rotated thereon with the assistance of a knurled rim 26b. This rim 26b is formed integrally on the outer sleeve 26 in which a longitudinal slot 26a engaged by the pin 22 is formed adjacent to its rear end. From the foregoing it will be readily apparent that with a single cam-groove formed through the tube 17 it is possible to control the movements of both intermediate movable elements. The rigidity of this tube 17 will thus be preserved so that the precision of the assembly will be increased accordingly.

The fixed optical element 14 positioned at the rear of the device is mounted in the rear wall or bottom 17a of the tube 17 and the fixed element 11 positioned at the front end of the assembly is mounted in a knurled barrel 27 formed with an internally-threaded portion 27a adapted to engage a corresponding externally-threaded portion 17b on tube 17 so as to permit the focusing of the assembly according to the distance of the objects to be photographed.

What I claim is:

1. Mechanism for variable focal length objective of the type comprising on a common axis two fixed optical elements and between said fixed optical elements two movable optical elements, both movable axially according to a law such that the objective gives of an object situated at a fixed distance an image of which the distance from said fixed elements remains constant whereas its magnification varies continuously, said mechanism comprising a fixed supporting tube having said fixed optical elements mounted at its ends, a first barrel supporting one of said movable optical elements which is fitted on and adapted to rotate concentrically to said supporting tube, said first barrel being operatively connected through a curved cam slot guide mechanism to said fixed supporting tube so that to each rotational movement of said first barrel there corresponds the desired axial movement thereof; a second barrel supporting the other movable optical element which is fitted on and adapted to rotate concentrically to said supporting tube, said second barrel being operatively connected through another curved cam slot guide mechanism to said supporting tube so that to each rotational movement of said second barrel there corresponds the desired axial movement thereof; said first barrel and second barrel being positively interconnected inside the said fixed supporting tube whereby said barrels may rotate bodily with each other without interfering with their respective axial movements, and control means actuatable by hand from outside said supporting tube for rotatably driving one of said barrels.

2. Mechanism for variable focal length objective according to claim 1, wherein said first barrel and second barrel are interconnected by means of lateral longitudinal feathers integral with said first barrel, said feathers engaging corresponding longitudinal grooves formed in said second barrel in smooth frictional engagement.

3. Mechanism for variable focal length objective according to claim 2, wherein said lateral longitudinal feathers are connected together at their ends beyond the said second barrel by a ring member centered in a bore of said fixed supporting tube.

4. Mechanism for variable focal length objective according to claim 1, wherein said control means consists of an external control ring rotatably movable but axially fixed on said fixed supporting tube, said control ring comprising means for rotatably driving one of said barrels.

References Cited in the file of this patent

UNITED STATES PATENTS

| | | |
|---|---|---|
| 1,950,166 | Durholz | Mar. 6, 1934 |
| 1,988,390 | Naumann | Jan. 15, 1935 |
| 2,377,821 | Sperry et al. | June 5, 1945 |
| 2,514,239 | Hopkins | July 4, 1950 |
| 2,566,485 | Cuvillier | Sept. 4, 1951 |

FOREIGN PATENTS

| | | |
|---|---|---|
| 536,706 | Great Britain | May 23, 1941 |
| 1,014,069 | France | May 21, 1952 |